(12) United States Patent  
Ahlert et al.

(10) Patent No.: US 8,484,567 B2  
(45) Date of Patent: Jul. 9, 2013

(54) SYSTEMS AND METHODS FOR PERSONALIZING SOFTWARE PROGRAMS

(75) Inventors: Dirk Ahlert, Muhlhausen (DE); Christian Guenther, Mannheim (DE); Jochen Kountz, Hockenheim (DE)

(73) Assignee: SAP AG, Walldorf (DE)

( * ) Notice: Subject to any disclaimer, the term of this patent is extended or adjusted under 35 U.S.C. 154(b) by 1848 days.

(21) Appl. No.: 11/138,689

(22) Filed: May 27, 2005

(65) Prior Publication Data

US 2005/0273719 A1    Dec. 8, 2005

(30) Foreign Application Priority Data

May 29, 2004    (EP) ..................................... 04012831

(51) Int. Cl.
*G06F 3/00*    (2006.01)

(52) U.S. Cl.
USPC ........... 715/745; 715/735; 715/744; 715/747; 715/765

(58) Field of Classification Search
USPC ......................... 715/745, 735, 744, 747, 765
See application file for complete search history.

(56) References Cited

U.S. PATENT DOCUMENTS

| | | | | |
|---|---|---|---|---|
| 5,832,505 | A * | 11/1998 | Kasso et al. | 707/104.1 |
| 6,266,661 | B1 * | 7/2001 | Lewish et al. | 707/3 |
| 6,324,578 | B1 * | 11/2001 | Cox et al. | 709/223 |

OTHER PUBLICATIONS

PCT Search Report and Written Opinion, dated Aug. 31, 2005 (14 pages).

* cited by examiner

*Primary Examiner* — Weilun Lo  
*Assistant Examiner* — Rashedul Hassan  
(74) *Attorney, Agent, or Firm* — Finnegan, Henderson, Farabow, Garrett & Dunner, LLP

(57) ABSTRACT

Systems and methods are provided for personalizing software programs in a computer system. In accordance with one implementation, default values for personalization data adapted to or harmonized with the individual needs or preferences of the end-user are provided to a plurality of end-users at start-up of a program. Further, two personalization levels are provided, including a first personalization level containing administrative personalization data which can be set by a system administrator, and a second personalization level containing individual personalization data, which can be set by the end-user. A data filing system for this personalization data may be of a hierarchical structure.

23 Claims, 13 Drawing Sheets

| 1 | 2 |
|---|---|
| CO | |
| CO-CCA | CO |
| CO-OPA | CO |
| CO-CCA-PLAN | CO-CCA |
| CO-CCA-IS | CO-CCA |

Fig. 1

| 1 | 2 | 3 | 4 | 5 | 6 | 7 | 8 | 9 | 10 | 11 | 12 | 13 |
|---|---|---|---|---|---|---|---|---|----|----|----|----|
| CO-CCA | COCTR | ... | ... | ... | ... | ... | ... | ... | ... | ... | ... | ... |
| CO-CCA-PLAN | VERSP | ... | ... | ... | ... | ... | ... | ... | ... | ... | ... | ... |
| CO-CCA-PLAN | FYEAR | ... | ... | ... | ... | ... | ... | ... | ... | ... | ... | ... |

Fig. 2

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| U | SMITH | CO-CCA | COCTR | A | 30.06.2004 | 1 | 01.01.2004 | M | ADMIN | 00:00:01 | V | I | EQ | 1000 | |
| U | WILSON | CO-CCA | COCTR | A | 31.12.2004 | 2 | 01.07.2004 | M | ADMIN | 00:00:04 | V | I | EQ | 1000 | |
| U | SMITH | CO-CCA | COCTR | I | 31.12.2004 | 3 | 01.01.2004 | | SMITH | 00:30:01 | V | I | EQ | 1111 | |

Fig. 3

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| U | SMITH | CO-CCA | COCTR | I | 31.12.2004 | 1 | 01.01.2004 | | SMITH | 00:00:01 | H | I | EQ | GROUP1 | |
| U | SMITH | CO-CCA | COCTR | R | 31.12.2004 | 2 | 01.01.2004 | | SMITH | 00:00:02 | V | I | EQ | 1000 | |
| U | SMITH | CO-CCA | COCTR | R | 31.12.2004 | 3 | 01.01.2004 | | SMITH | 00:00:02 | V | I | EQ | 1111 | |
| U | SMITH | CO-CCA | COCTR | R | 31.12.2004 | 4 | 01.01.2004 | | SMITH | 00:00:02 | V | I | EQ | 2000 | D |
| U | SMITH | CO-CCA | COCTR | I | 31.12.2004 | 5 | 01.01.2004 | | SMITH | 00:00:05 | I | I | BT | A | |
| U | SMITH | CO-CCA | COCTR | R | 31.12.2004 | 6 | 01.01.2004 | | SMITH | 00:00:06 | V | I | EQ | B1 | |
| U | SMITH | CO-CCA | COCTR | R | 31.12.2004 | 7 | 01.01.2004 | | SMITH | 00:00:06 | V | I | EQ | B2 | |
| U | SMITH | CO-CCA | COCTR | R | 31.12.2004 | 8 | 01.01.2004 | | SMITH | 00:00:06 | V | I | EQ | C1 | |

Fig. 4

Legend for Fig. 1

| Column Number | Short Description | Meaning | Special Characteristic |
|---|---|---|---|
|  | CO | Controlling |  |
|  | CO-CCA | Cost Center Accounting |  |
|  | CO-OPA | Internal Orders |  |
|  | CO-CCA-PLAN | Cost Center Planning |  |
|  | CO-CCA-IS | Cost Center Information System |  |
| 1 | APPLID | Name of the personalization application (hierarchy node) | Key field |
| 2 | PARENT_APP | Name of the parent personalization application (superior node) |  |

Fig. 5

Legend for Fig. 2

| Column Number | Short Description | Meaning | Special Characteristic |
|---|---|---|---|
|  | COCTR | Cost Center |  |
|  | VERSP | Plan version |  |
|  | FYEAR | Fiscal year |  |
| 1 | APPLID | Name of the personalization application (hierarchy node) | Key field |
| 2 | FIELDNAME | Name of the personalization characteristic | Key field |
| 3 | FILL_HELP | Input help (technical field: offer input help) |  |
| 4 | HIER_FLAG | Group flag (single/multiple selection) |  |
| 5 | INT_FLAG | Interval flag (single/multiple selection) |  |
| 6 | SGL_FLAG | Single value flag (single/multiple selection) |  |
| 7 | COMPTYPE | Reference data type |  |
| 8 | COMPTYPE_SET | Reference data type (for groups) |  |
| 9 | RESOLVE | Resolve groups and intervals |  |
| 10 | REFTAB | Name of the reference table (value field) |  |
| 11 | REFFLD | Reference field (value field) |  |
| 12 | REF_SET_TAB | Name of the reference table (group field) |  |
| 13 | REF_SET_FLD | Reference field (group field) |  |

Fig. 6

Legend for Figs. 3 and 4

| Column Number | Short Description | Meaning | Special Characteristic |
|---|---|---|---|
|  | ADMIN | Administrator |  |
|  | SMITH | Name of user 1 |  |
|  | WILSON | Name of user 2 |  |
| 1 | PERS-KEYTP | Type of key for the personalization data records (user, user profile, ...) | Key field |
| 2 | PERSKEY | Key for the personalization data records (user, user profile description) | Key field |
| 3 | APPLID | Name of the personalization application (hierarchy node) | Key field |
| 4 | FIELDNAME | Name of the personalization characteristic | Key field |
| 5 | ORIGIN | Origin of values (automatic maintenance [A], individual maintenance [I], resolved data records [R]) | Key field |
| 6 | DATETO | Date valid to | Key field |
| 7 | FIELDINDEX | Continuous index (technical field: unique value in data record for each personalization characteristic | Key field |
| 8 | DATEFROM | Date valid from |  |
| 9 | NOAUTH | No authorization extraction (data record originates from mass maintenance → authorization was not verified) |  |
| 10 | USER-NAME | Name of the user that added (posted) the data record |  |
| 11 | TIMESTMP | Time when data record was entered in Greenwich Mean Time (time stamp of posting) |  |
| 12 | FIELDTYPE | Field type (individual value [IV], interval [I], group/set [H]) |  |
| 13 | SEL_SIGN | Selection operator (technical field: the limits specified in LOW/HIGH are included [I]) |  |
| 14 | SEL_OPTION | Selection operator (technical field: only LOW value is filled [EQ], LOW and HIGH values filled [BT]) |  |
| 15 | LOW | LOW value for limit (for example, cost center number) |  |
| 16 | HIGH | HIGH value for limit (for example, cost center number) |  |

Special table columns: 6, 8-11

Fig. 7

SYSTEMS AND METHODS FOR PERSONALIZING SOFTWARE PROGRAMS

This application claims the benefit of priority from European (EP) Patent Application No. 04012831.6, filed May 29, 2004. The entire contents of EP 04012831.6 are expressly incorporated herein by reference to their entireties.

BACKGROUND

I. Technical Field

The present invention generally relates to computer systems and software. More particularly, the invention relates to systems and method for personalizing software programs in a computer system.

II. Background Information

In the present description, a software program shall be defined as being equivalent to a software application, i.e., a user program or an application, and refers to the software program in need of the personalization data of an end-user as selection criteria to be able to start-up. The concept of personalizing data for specific software applications is known in the art. This involves storing pairs of characteristic name-characteristic values of users. The purpose of the personalization is for predefinition in a user-specific fashion and the saving of these characteristic name-characteristic value pairs, which are needed by a software application for its execution.

In this context, the end-user is the user or "applier" of the software application, i.e., the individual ultimately executing a software application. Usually, the software application is in need of personalization data of the end-user as selection criteria in order to be able to start-up. An administrator is also a user, but one whose administrator rights authorize him or her to store personalization data for end-users.

Personalization data (for a certain personalization characteristic) are called characteristics flags (for a certain personalization characteristic). Therefore, these are characteristics values (for a certain personalization characteristic), i.e., personal selection criteria (for a certain personalization characteristic) of an end-user, i.e., the flags of a certain personalization characteristic deposited per end-user. The personalization involves the capture of the personalization data for a personalization characteristic (characteristics flags) that are captured.

With regard to a personalization characteristic, personalization data, i.e., the actual flags or values for this characteristic, are deposited in the process of personalization.

However, the practical application of a personalization of software programs in large computer systems, i.e., in systems in which many end-users start-up software applications, or in large, comprehensive software program packages, face the following problems which are not solved in a satisfactory fashion by prior approaches.

There may be a very large amount of personalization data which needs to be managed in an appropriate fashion. This applies both to the amount of personalization data per end-user and to the total amount of personalization data to be taken into consideration in the computer system for all end-users.

Furthermore, upon start-up of a software application in a large computer system with many end-users or with a large amount of personalization data of an end-user or in a large software program package, there is considerable resource use required for data transfer and for data harmonization in order to compile and take into consideration the personalization data needed for the execution of the software application.

Finally, the maintenance of the personalization data is also resource-intensive. Usually, the maintenance of the personalization data is performed by the end-users, who often expend considerable efforts in setting in a harmonized fashion the multiplicity of options contained in a large software program to suit their needs. This also put demands on the system administrator, since measures must be undertaken in the computer system to ensure that end-users do not over-step their authorization. Taken together, this results in considerable efforts being expended by the system administrator and the end-user in setting up individual personalization data and adapting such data to changing needs.

—Whereas simple software applications usually can manage with a simple form of personalization, i.e., with simple combinations of characteristic name-characteristic value, the requirements of microeconomic software applications with regard to a personalization framework are significantly more extensive due to their complexity.

U.S. Pat. Nos. 6,324,578 and 5,832,505 disclose methods for application configuration of software applications involving personalization in a less-strict sense, in which aspects of administration, configuration, and customizing of software applications are fulfilled in the adaptation of a system to the end-user. However, an application configuration of this type does not necessarily include an adaptation to the needs or preferences of an end-user, i.e., a personalization in a stricter sense is not necessarily performed. The personalization in a stricter sense according to the present invention is an individualization that is performed for end-users, but not necessarily by the end-users. This form of adaptation in a stricter sense optimizes the working habits of the end-users and is valid for longer than just one working session.

In U.S. Pat. No. 6,324,578, user preferences are being used, which may be interpreted to be individualizations in a less strict sense, i.e., administration, configuration or customizing settings. These settings are combined into so-called configuration sets. The configuration sets are stored in the form of files. It is not possible, however, to capture and save personalization data on the level of individual characteristics. Administrators save data or files for user groups or roles, rather than on the level of the individual end-user. Therefore, the known method is relatively inflexible.

Moreover, although U.S. Pat. No. 6,324,578 mentions that there may be various sources for the determination of personalization data, no actual solution to the central problem of where these sources originate is provided. In the personalization process, the problem of where this personalization data originates, for example, whether this data is derived from somewhere, e.g., from the context, or if all of it needs to be maintained manually, needs to be solved.

On the basis of know approaches as described above, an object of the invention is to provide a system and method for personalizing software programs of the type mentioned above, in which the deposition and maintenance of personalization data is performed as part of an individualization, i.e., a personalization in the stricter sense, in a simpler fashion.

SUMMARY OF THE INVENTION

In view of the foregoing, systems and methods are provided for personalizing software programs in a computer system. Consistent with embodiments of the invention, default values for personalization data for a plurality of end-users may be determined at start-up of a program in the computer system. The personalization data can be of significance for the actual procedure or execution of the program.

In accordance with one embodiment, a method is provided for personalizing software programs in a computer system. Default values for the personalization data in the computer system may be determined for a plurality of end-users upon start-up of a program. The default values may be individually personalized for a specific end-user, such that the program started-up by the end-user runs in a fashion that is harmonized with the individual needs or preferences of the end-user as determined by the personalization data.

Two levels of personalization may be implemented and in each case personalization data for end-users can be stored. The first, administrative personalization level contains administrative personalization data for end-users which can be set by a system administrator, but not by the end-user. The second, individual personalization level contains additional, individual personalization data, which can be set by the end-user, whereby the individual personalization data of the individual personalization level overrides, modifies, or limits the administrative personalization data of the administrative personalization level. During execution of the program, the personalization data can be relevant for the actual run of the program.

In another embodiment, the personalization according to the invention can be performed for personalization characteristics and the corresponding personalization data, i.e., characteristics and characteristic values of any type. Embodiments of the invention shall be described herein in an exemplary fashion for the characteristic "cost center" within the framework of an economic software program, without limiting the general applicability of the invention. For example, cost centers entered for an end-user in the authorization master file can be limited further for the software application. This may allow a manager, for example, to specify that two of his or her cost centers serving only for set-off purposes are not displayed on his or her monitor. By means of a personalization dialog, the end-user or an administrator acting in a central fashion, if applicable, can capture the personalization data for one or multiple end-users.

In a different but equivalent terminology, the term "characteristic" may be replaced by the term "attribute," the term "characteristic" by the term "attribute value," and the term "characteristic attribute" by the term "attribute expression" in the context of the present invention.

In another embodiment, the option of inputting personalization data may be embedded in an authorization and personalization framework. With regard to the "cost center" characteristic, this framework may initially provide for the determination of the allocation of cost center to end-users either from the organization management or from the cost center master file and, if applicable, generate the corresponding authorizations automatically. In turn, the authorizations of an end-user can be used initially to obtain the personalization data in an automatic fashion. In the next personalization step, either the end-user, in an individual fashion, or the system administrator, in a central fashion, can limit the data further, which may affect the data selection of the software program utilizing this personalization data. Since it is not possible to derive each characteristic to be personalized from authorizations (e.g., the business year to be planned in a planning application), providing the option of direct maintenance of the personalization by the administrator and/or end-user may be of great significance.

In another embodiment, the personalization itself may comprise a data filling system arranged in a hierarchical structure, i.e., a personalization hierarchy, as well as personalization dialogs by means of which the personalization data can be entered. Both the personalization dialogs and the personalization hierarchies can be changed or newly generated by the administrator and/or possibly the end-user. Accordingly, the personalization may consist of a data filling system arranged in a hierarchical structure (personalization hierarchy) and personalization dialogs allowing the personalization data to be captured and deposited in a user-specific fashion.

A personalization dialog may provide an input mask or graphical user interface (GUI) on an input monitor, i.e., an input mask for use by the end-user or administrator. The input mask may contain a certain number of personalization characteristics and allows to capture personalization data, i.e., characteristic flags, with regard to these personalization characteristics.

In another embodiment, the personalization hierarchy may consist of personalization nodes in a corresponding hierarchical arrangement, whereby the term, "node" shall be a generic term to which additional characteristics are allocated. Accordingly, a personalization node is a node of the personalization hierarchy or personalization application, and, except for the top node of the personalization hierarchy, every node has exactly one parent node. A total of 1 to n personalization characteristics may be associated with and allocated to each node. Theoretically, nodes without personalization characteristics are also conceivable, though these would have a purely ordering function within the personalization hierarchy. For example, there is a node for the cost center information system, whereby at least one personalization characteristic, e.g., the "cost center" characteristics, should be allocated to each node. Personalization nodes without even a single allocated characteristic are of a purely structuring character.

A node of the personalization hierarchy may often communicate with certain applications. For example, the cost center planning node will communicate with the planning application. This usually applies to the nodes on the lowest level of the personalization hierarchy. However, it can also occur that several different software applications access the same personalization node.

In another embodiment, the personalization data may be stored in accordance with the personalization hierarchy in a user-specific fashion. For each personalization characteristic, the node of the personalization hierarchy to which the characteristic belongs is specified unambiguously. Therefore, flags, i.e., personalization data, can be assigned unambiguously to this node for this personalization characteristic for each end-user. For each personalization characteristic, the corresponding data type information can be deposited such that the corresponding personalization data can be read-out, displayed, and stored correctly for the respective data type.

Accordingly, additional features may be provided. For example, a hierarchically arranged data filling system for personalization data or a dialog software for inputting personalization data for end-users by the end-user and/or the system administrator, whereby the dialog software comprises input masks. In this context, a personalization dialog can contain any personalization characteristics for any personalization nodes of the personalization hierarchy.

In preferred embodiments, the dialog software can be a browser software, in particular a browser software for web applications, since a browser software of this type usually is implemented for the administrator and/or the end-users in a computer system at which the invention is directed. The dialog software does not necessarily have to be implemented in the form of a browser software, but might be an integral component of some other software, e.g., a business software such as an SAP system. A preferred implementation may utilize a browser application in order to be able to ensure the integration of the personalization dialogs in a company portal.

According to another embodiment, the personalization data stored on the personalization levels may comprise of personalization data relating to information that can be displayed to the end-user at the start-up of the program. The selection and definition of defaults with regard to the information or data to be displayed on the screen to an end-user upon start-up of a software application is of great significance in practical application. Embodiments of the present invention may provide this feature both on an administrative and individual level.

A further embodiment provides that the tree structure of the personalization hierarchy comprises of nodes with associated personalization characteristics, which are lower-ranking in the hierarchy than higher-ranking nodes with associated personalization characteristics such that a user program reading out the personalization data on personalization characteristics of a certain lower-ranking node is automatically provided also with the personalization data on personalization characteristics of nodes ranking higher in the direct analytical path. In this embodiment, the personalization hierarchy is provided to possess a basic functionality which facilitates the transfer of personalization characteristics from top to bottom along the path of the hierarchy.

According to another embodiment of the invention, personalization data is stored in an individual fashion while avoiding redundancy. The personalization data is required when parameterized applications are started-up. When the application is then started-up by an end-user at a certain (later) point in time, the application parameters and corresponding personalization data needed are set to the corresponding personalization data as defaults.

In this context, the personalization hierarchy allows the complete application context to be provided without having to store the corresponding data multiply in a database, because the application context is available on the level of the individual characteristic in the personalization framework according to the invention.

In this context, the personalization hierarchy is utilized such that an application can be sure to find in the direct analytical path of the hierarchy all characteristics (plus personalization data) belonging to its context.

A software application utilizing the personalization and accessing the stored personalization data enters on a certain level of the personalization hierarchy; in the majority of cases on the lowest level. This software application can then be provided with the personalization data of the entry hierarchy level and single, multiple or all hierarchy levels along the hierarchy that are above the entry node. This means that the selection of the input fields of a personalization dialog does not necessarily have to relate to the personalization characteristics of a single node of the personalization hierarchy. Certain central characteristics are filed at higher-ranking nodes in the personalization hierarchy (e.g. the cost-calculation cycle), whereas other more specific characteristics are filed at lower-ranking nodes (e.g. the current version of an application for planning purposes). By providing for the option of providing to a software application the personalization data for personalization characteristics of nodes ranking higher than the entry hierarchy level, substantial time savings are achieved in the process of saving the personalization data, since this data does not need to be entered in the books redundantly.

For example, a planning application can access the corresponding planning node of the personalization hierarchy for a certain end-user in order to determine the end-user's personalization data as required for the planning. Specific characteristics, such as the business year to be planned or the version to be planned, can be filed at this planning node. In turn, personalization data on characteristics such as cost centers of the end-user or the cost calculation cycle are communicated to the software application by hierarchy nodes ranking higher in the personalization hierarchy.

Advantageously, it is provided that it may be set in the software application which personalization data is retrieved from the administrative personalization and which from the individual personalization. Consequently, a software application can decide whether to access the administrative personalization data, i.e., personalization data set in a central fashion, or the individual personalization data, i.e., personalization data maintained by the end-user. In a further embodiment of the invention, a sequential order of access can be set.

In this context, the term, "sequential," shall mean for example, that, in a certain implementation, the software application attempts to read-out the individual personalization first and proceeds only thereafter to access the administrative personalization provided it does not find any information in the individual personalization. A different implementation may, for example, provide for a software application to ignore the administrative personalization as a matter of principle and always access the individual personalization only. Therefore, an advantageous feature can consist of the personalization data being read-out in sequential order, whereby it is preferably set in the software application which of the personalization data thus read-out is required for the start-up of the software application.

One option for reducing the complexity of microeconomic software applications may be to spare the end-user from having to complete input masks, i.e., the input of selection criteria in the dialog for the actual software application, as much as possible. The personalization according to one embodiment of the invention allows this requirement to be met such that the related burden on an end-user is minimized.

A further embodiment may consist of the personalization data comprising default values for certain user profiles. By this means, it may be possible to pre-set simplified standards or defaults which requires little effort. In this context, a user profile comprises of multiple end-users who utilize this profile and who wish to access, fully or partly, identical personalization characteristics and their corresponding personalization data.

A still further embodiment may consist of the personalization data being input by an end-user (individual personalization) and/or an administrator (administrative personalization), preferably in a personalization dialog. A personalization dialog for the input of personalization data can contain any selection of personalization characteristics. When a personalization dialog is started-up, an end-user or an administrator can capture on their screen the personalization data corresponding to the personalization characteristics of this dialog.

According to another embodiment, an administrator can set which personalization data can be changed individually by an end-user and/or which personalization data cannot be changed individually by an end-user. This provides for "customizing" with regard to the maintenance authorization for the personalization data by an end-user. For clarification purposes, it shall be emphasized here that a personalization framework consistent with embodiments of the invention does not operate with lists or files (collections of characteristics), but rather on the individual characteristic level.

According to another embodiment, it is proposed that the method may comprise of a tool for automatic determination of administrative personalization data. This tool can be used by the administrator for automatic completion or entering of the personalization. In this case, the personalization data for an end-user can be determined automatically and stored on the corresponding personalization level by the computer system. Rather than simple parameter defaulting at program start-up, automatic determination shall go beyond this level and be an actual procedure for completing or entering the personalization data as obtained from a certain source.

A still further embodiment provides for the automatic determination of personalization data to be performed on the level of end-user authorizations. This is based on the fact that in many cases the permissible personalization data of an end-user (e.g., an end-user's authorization to inspect company data) may be a larger set of data as compared to what the end-user wishes to access in an actual application (e.g., the company data which are actually of interest to the end-user). This structure is imaged and taken into account in the personalization, and in a method consistent with embodiments of the invention, an administrator can set the corresponding selection for completion of the personalization with little effort. Therefore, the personalization, i.e., the determination of the personalization data for end-users, utilizes the authorizations of the end-users.

Thus, this may provide for very extensive integration of the personalization framework according to the invention in existing authorizations on the level of characteristics. It may be possible for end-users from different user groups to each have the same preferences and personalization data and even then they can have different authorizations. Embodiments of the invention can account for cases of this type as part of an individualization.

A still further embodiment may comprise of a tool for automatic determination of individual personalization data. However, the individual personalization will usually be performed by the end-user.

The automatic determination of personalization data may be advantageous in that not every end-user needs to maintain the personalization individually before a software application in need of personalization data can be started-up, and in that certain personalization data which is expected to apply to one end-user or multiple end-users can be derived automatically and stored centrally. In this context, embodiments of the invention do not limit the end-user, meaning that he or she is still in a position to adapt the personalization individually after all.

Embodiments of invention can be used to capture and store personalization data on the level of single characteristics with neither configuration sets nor configuration files being required. Therefore, the personalization framework according to embodiments of the invention may provide significantly more flexibility as compared to a method known from document, U.S. Pat. No. 6,324,578 B1, for example. Moreover, the personalization framework according to embodiments of the invention provides the option of storing the personalization data for end-users only regardless of whether the data is captured by a machine, by the administrator or by the end-user himself. In particular, in this context this means that administratively captured data regarding user preferences is also always user-specific, i.e., when an administrator captures personalization data, this data is stored on an individual end-user level.

In another embodiment, the information which can be obtained from the authorizations of an end-user are linked to the end-user's personalization data. In an integrative aspect thereof, it makes sense for default personalization data to correspond exactly to those characteristic flags, with regard to which an end-user possesses the corresponding authorizations.

One advantageous feature can be that a time dependence associated with the personalization data is stored. In this case, a time dependence is assigned to the personalization data for a personalization characteristic. This can also be performed at an earlier time, e.g., in a scenario involving the maintenance of personalization data for cost centers, which do not yet exist at the time the personalization data is stored, but is to be generated at a later point in time. The evaluation and processing of the personalization data can then be performed by the software program accessing the personalization data. This provides for a further increase of the flexibility of data organization.

A stored time dependence may, for example, be a duration of validity. In this context, the term, "duration of validity," shall not be limited to the time dimension alone, but rather can refer to numerous pieces of time information. The more extensive understanding of the time dependence according to the invention can be illustrated as follows: it is possible to store for a characteristic, "cost center," for example, for the year 2005, not only the "current" flag, i.e., the "current" value of the characteristic, but also the valid flag for the year 2006, in case the cost center for the year 2006 is to be different from the cost center for the year 2005. An according procedure can be adopted with regard to past personalization data. Referring to the same example, a cost center history could be tracked or an application could deliberately use a cost center that was personalized in the past.

To extend the cost center example, it shall be added that the cost center read-out from the personalization filling system for a certain point in time does not automatically have to be the "correct" cost center for an application. This can ultimately be assessed only by the application, e.g., as part of validity testing the cost center provided from the personalization filling system. In this sense, the personalization filling system is free of any application logics; rather, it simply stores (in a time-dependent fashion) for each end-user the flag, i.e., the characteristic value for the characteristic, "cost center."

A still further embodiment can comprise of the dynamic calculation and/or determination of personalization data by means of personalization variables, e.g., by means of a time information. Taking a planning application as an example, the parameter, "following year," can be determined on the basis of the current date. The dynamic determination and/or analysis of the time information is only one example of many of a possible personalization variable. Ultimately, for every variable there is a program which calculates or determines the corresponding value for a personalization variable. Dynamic personalization may also provide for very flexible handling of the personalization.

Embodiments of the invention can advantageously provide for the deposition of personalization characteristics for a node of the personalization hierarchy, with regard to which personalization characteristics multiple flags of personalization data can be stored. For example, for a single or multiple personalization characteristics, preferably for all personalization characteristics, it is being set whether the corresponding personalization data can be stored only in the form of a single or in multiple flags. In this context, a flag shall be defined as an actual content of a personalization characteristic. For example, a certain account number as the actual flag belongs to the personalization characteristic, "account number," and an actual cost center belongs to the personalization characteristic, "cost center." Embodiments of the invention allow multiple flags for a personalization characteristic to be deposited in the personalization, which renders the embodiment very flexible.

A further advantageous feature can be to set for a single or multiple personalization characteristic(s), preferably for all personalization characteristics, whether the corresponding personalization data is stored in the form of single values, intervals or groups. For example, a range of cost centers is stored in the personalization, whereby the cost centers actually used are from this range.

The storage of ranges, intervals or groups provide an advantage in that not all single values contained therein need to be stored in a database. A range of cost centers may be deposited, and the cost centers actually used may be values from this range. This allows the provision of information to a software application in need of personalization data in a simpler and more rapid fashion without necessitating a resource-consuming search in the computer system. In case of need, the ranges, intervals or groups can be resolved later during its run time by the software application in need of the individual flags of the personalization data.

It is advantageous according to a further aspect of the invention to set for a single or multiple personalization characteristic(s), preferably for all personalization characteristics, stored in the form of intervals or groups that, in addition, personalized intervals and/or groups are resolved into their single values and stored. A software application reading-out this personalization data can then decide on the basis of pre-set rules whether to resolve the intervals and/or groups into single values during its run time in order to obtain the most current status or keep the (possibly obsolete) single values.

The determination of relevant personalization data and objects is an important aspect of the running time, especially in microeconomic software packages, whereas possible errors due to obsolete personalization data being deposited often are less significant. In particular, the resolution of groups requires much run time. Compared to a program querying a personalization according to known solutions, for example for 15,000 cost centers, the use of the personalization according to the invention affords a 10- to 50-fold reduction of the running time.

With regard to particularly critical personalization data, embodiments of the invention can provide that a software application accessing the stored personalization data during its execution checks in the computer system for special cases of a preset selection of particularly relevant stored personalization data whether or not that data is current. It is set directly in the software application which personalization data is to be checked and which is not.

According to another embodiment, a computer system with a client-server architecture may be provided to store the personalization data in the server only, but not in the client, such that it is provided to an end-user regardless of which client he or she uses for logging into the computer system.

This enables an end-user to log into the computer system from any terminal and start-up software applications, whereby the personalization data associated with him are always made available to him, since it is not stored on a certain terminal, i.e., a certain client.

Embodiments of the invention may be advantageous when used in software for microeconomic controlling, i.e., a program for company planning and company organization, e.g., a "Business Information Warehouse" or an SAP system. The practical operational use of software of this type, which often consists of a major software package and includes a large number of end-users and a large number of cost centers, is associated with a substantial organizational burden with regard to personalization. Embodiments of the invention provide for substantial simplification of the personalization in its practical application. According to an additional advantageous feature, the personalization data relate to cost centers of end-users.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiment of the invention and together with the description, serve to explain the principles of the invention.

BRIEF DESCRIPTION OF THE DRAWINGS

The invention shall be illustrated in more detail below on the basis of the exemplary embodiments shown in the figures. The particularities described therein can be used alone or in combination in order to generate preferred developments of the invention. The following is shown in the figures:

FIG. 1 shows an exemplary table reflecting a personalization hierarchy;

FIG. 2 shows an exemplary table describing properties of personalization characteristics;

FIG. 3 shows an exemplary table of updating automatically generated personalization sets;

FIG. 4 shows an exemplary table of updating personalization sets as well as their resolution into single sets;

FIG. 5 illustrates a legend for FIG. 1;

FIG. 6 illustrates a legend for FIG. 2;

FIG. 7 illustrates a legend for FIGS. 3 and 4;

DETAILED DESCRIPTION

Figure 8:
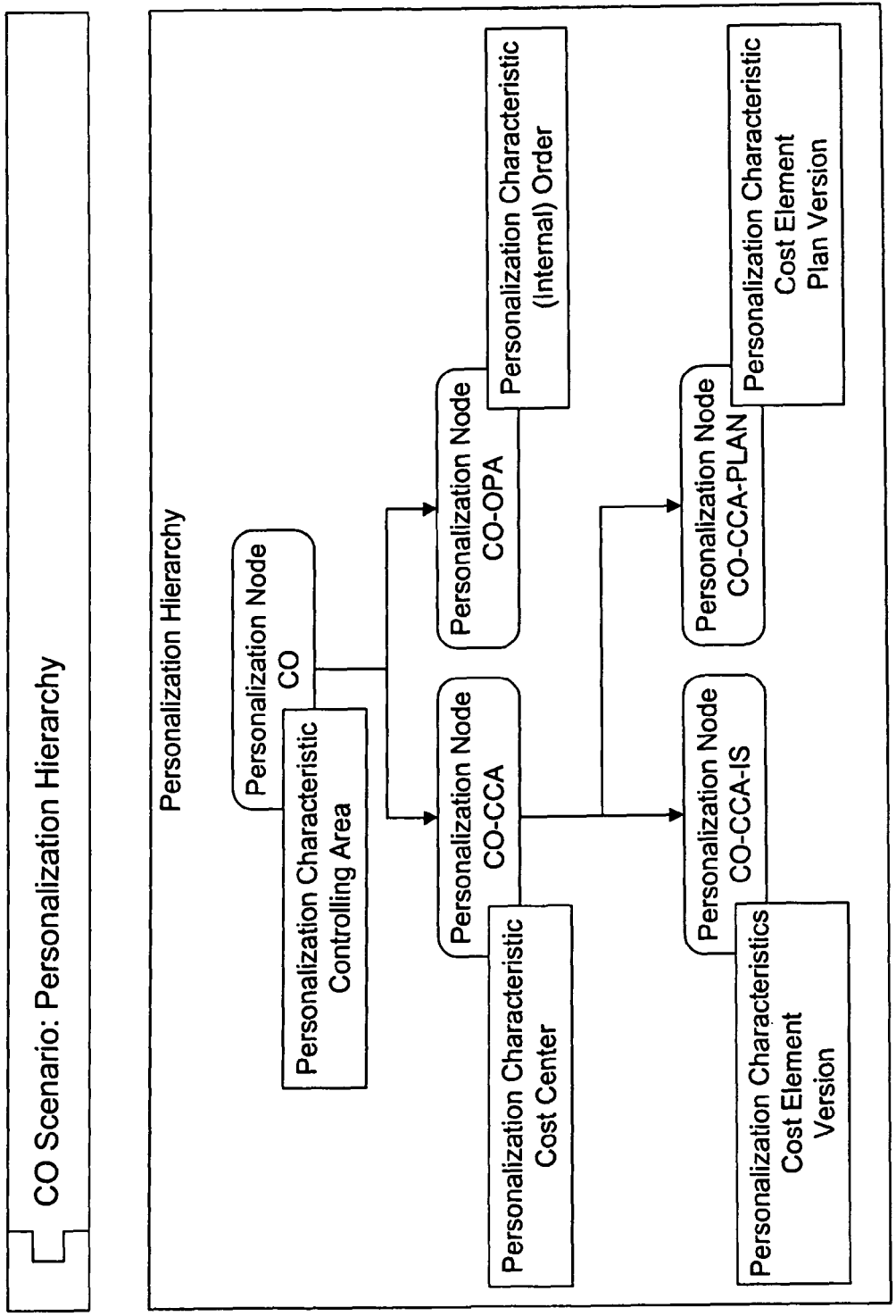
FIG. 8 shows an exemplary representation of a personalization hierarchy using controlling as an example.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

FIG. 1 shows an exemplary table reflecting a personalization hierarchy, i.e., a hierarchical arrangement of personalization applications/nodes (parent-son-relationships in a tree structure). The corresponding legend is shown in FIG. 5.

In the view of a user, a personalization framework consistent with an embodiment of the invention presents itself as follows. The framework may consist of a program interface for completing or entering input into the personalization filling system, i.e., software applications can use this interface to record personalization data. The framework may also consist of a web interface for end-users, i.e., end-users can use an input mask or GUI in the dialog to complete in or enter their personalization data in the personalization filling system (individual personalization).

The framework may further consist of another user interface for administrators, i.e., administrators can complete in or enter input into the computer system in a central fashion via an input mask in the dialog the personalization data for any end-user in the personalization filling system, as well as a program interface for read-out of the personalization data, i.e., software applications can use this interface to ad-out personalization data.

The core of the personalization framework may comprise three data base tables. For example, one table may reflect a personalization hierarchy as shown in FIG. 1, a second table may describe the properties of personalization characteristics as shown in FIG. 2, and a third table may be provided for storing personalization data as shown in FIGS. 3 and 4.

In FIG. 2, a exemplary table describing the properties of personalization characteristics is shown. The table, may record, for example, whether groups or intervals are permissible, and whether multiple single values can be entered, etc. The corresponding legend is shown in FIG. 6. Any number of personalization characteristics can be deposited for each personalization application (a "node" of the personalization hierarchy).

FIGS. 3 and 4, are exemplary tables for storing personalization data (characteristic flags). The legend for FIGS. 3 and 4 is shown in FIG. 7.

FIG. 3 shows an example of updating automatically generated personalization sets (in a mass maintenance of administratively generated data sets) and of individually-generated sets (in an individual end-user dialog, so-called I data sets) taking into account the time dependence. An administrator "Admin" may perform a central personalization for users, such as "Smith" and "Wilson." In the example shown, Smith is in charge of cost center 1000 from Jan. 1, 2004 to Jun. 30, 2004, whereas Wilson directs this cost center from Jul. 1, 2004 to Dec. 31, 2004. Subsequently, user Smith overrides the centrally-set personalization, by individually personalizing cost center 1111 for the time from Jan. 1, 2004 to Dec. 31, 2004.

FIG. 4 shows an example of updating personalization sets (in the form of groups or intervals), as well as their resolution into single sets (so-called resolved R data sets). Here, user "Smith" performs the individual personalization for the cost center group, "GROUP1," as well as for the cost center interval, A-D. At the time of personalization, the cost center group, "GROUP1," includes cost centers 1000, 1111, and 2000. Cost center interval A-D includes cost centers B1, B2, and C1. The particular table fields not accounted for earlier are the table columns 6 and 8-11.

FIG. 8 shows an exemplary representation of a personalization hierarchy using controlling as an example. FIG. 8 shows one potential flag for the personalization hierarchy using controlling as a micro-economic example. The hierarchical arrangement of personalization applications/nodes (parent-son-relationships in a tree structure) is utilized such that all general/application-transcending personalization characteristics (e.g., the cost calculation cycle) are assigned to higher-ranking nodes in the hierarchy, whereas specific/application-specific personalization characteristics (e.g., the plan version) are assigned to lower-ranking nodes in the hierarchy.

Figure 9:
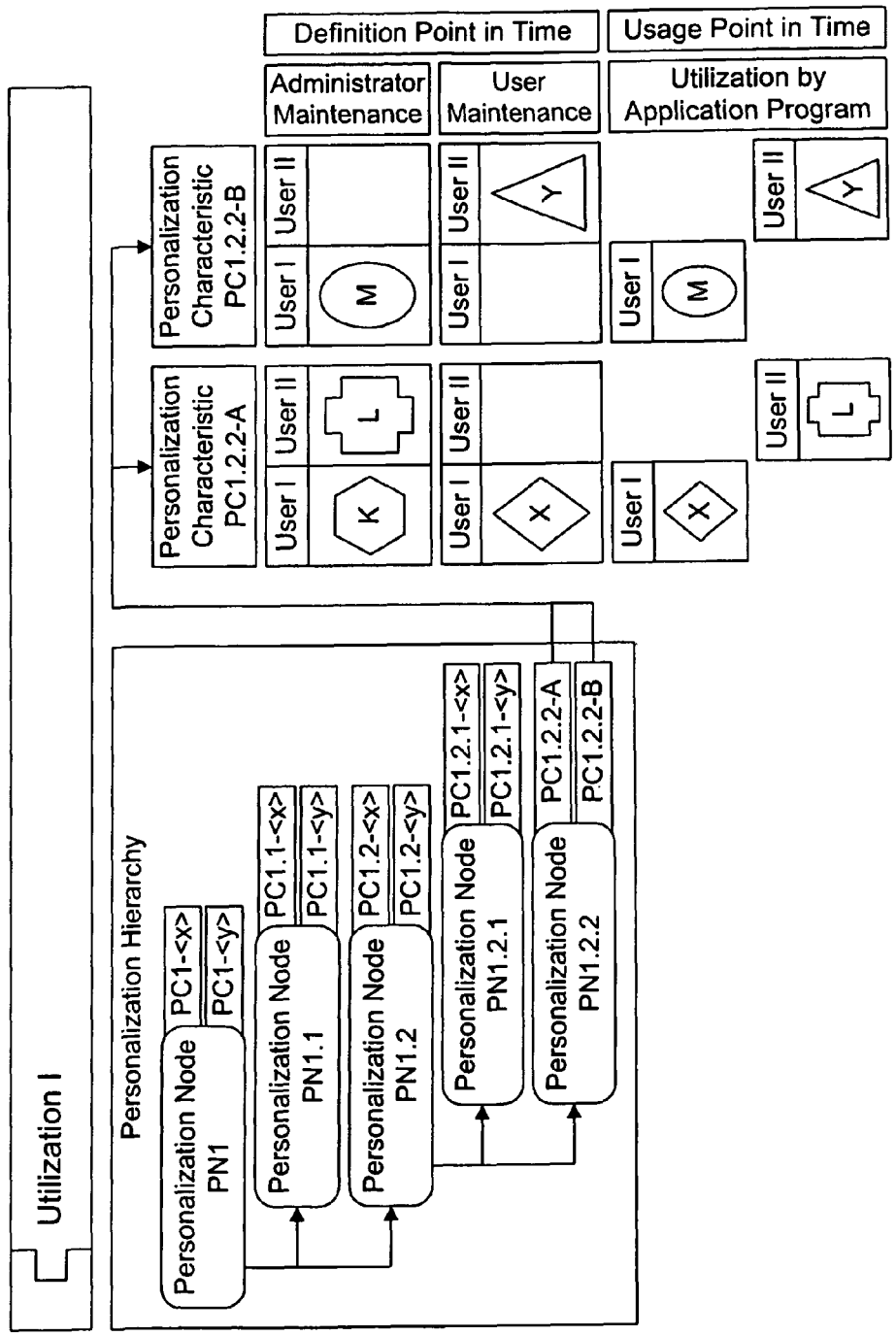
FIG. 9 shows a first example of the utilization of a personalization hierarchy.

FIG. 9 shows a first example of the utilization of a personalization hierarchy. While running, a software application needs the personalization data for two personalization characteristics. The personalization data can have been entered and stored at an earlier point in time by the administrator and/or end-user by means of a personalization dialog (see, e.g., FIG. 12). If different personalization data was entered for a characteristic by the administrator and the end-user, the personalization data of the end-user may override the personalization data of the administrator while the software application is running.

In the example in FIG. 9, the application program may need both the characteristics PC1.2.2-A and PC1.2.2-B belonging to personalization node PN1.2.2. The respective characteristic values could be maintained by the end-user. If no end-user characteristic values are found, the respective administrator values are chosen.

Figure 10:
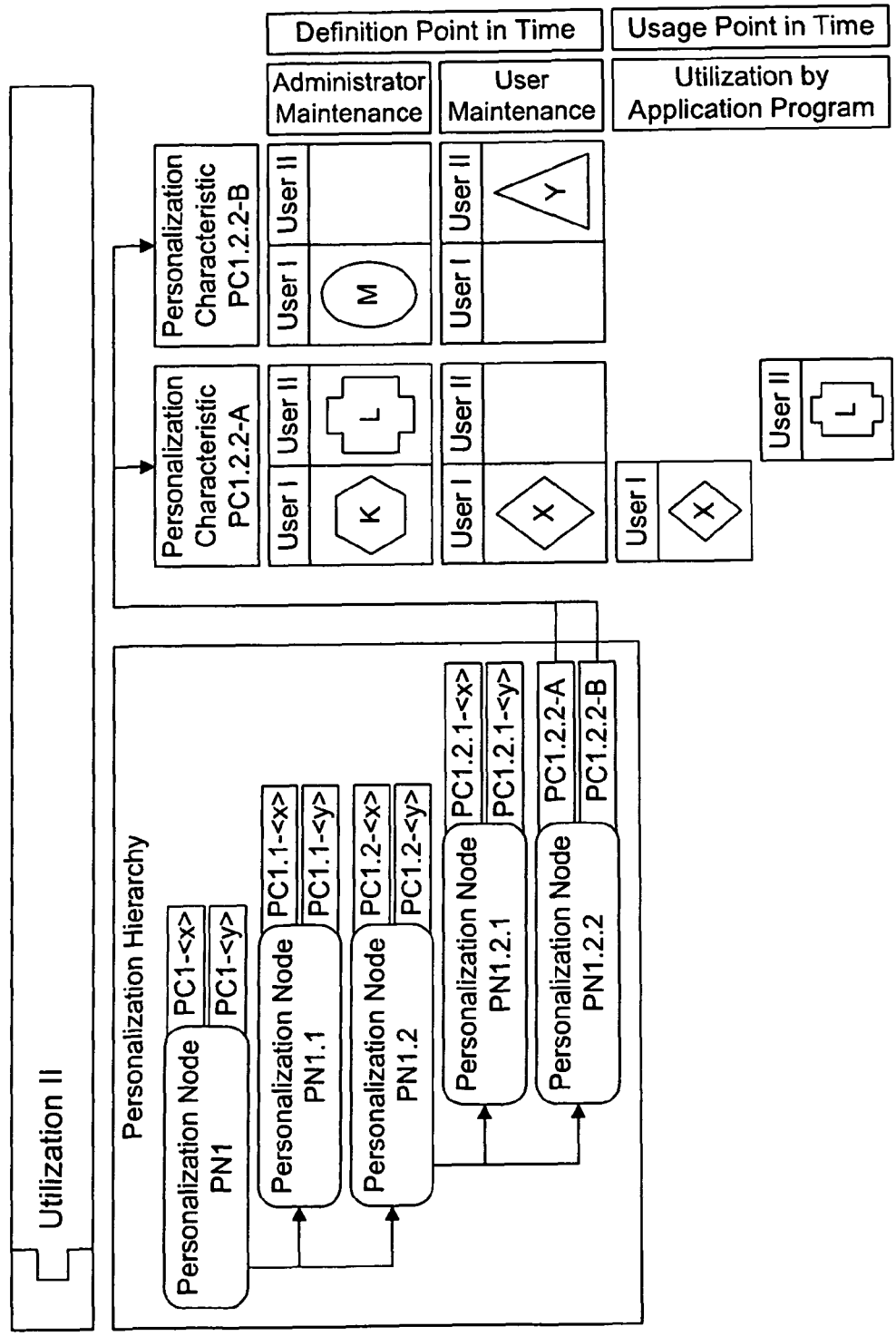
FIG. 10 shows a second example of the utilization of a personalization hierarchy.

FIG. 10 shows a second example of the utilization of a personalization hierarchy. While running, a second software application needs the personalization data for one personalization characteristic only, unlike in the example shown in FIG. 9. Only the needed personalization data belonging to this particular characteristic are made available to the software application. The personalization data can have been entered and stored at an earlier point in time by the administrator and/or the end-user by means of a personalization dialog (see, e.g., FIG. 13). If different personalization data was entered for a characteristic by the administrator and the end-user, the personalization data of the end-user override the personalization data of the administrator while the software application is running.

In the example in FIG. 10, the application program only needs the characteristic PC1.2.2-A belonging to personalization node PN1.2.2. The respective characteristic values could be maintained by the end-user. If no end-user characteristic values are found, the respective administrator values are chosen.

Figure 11:
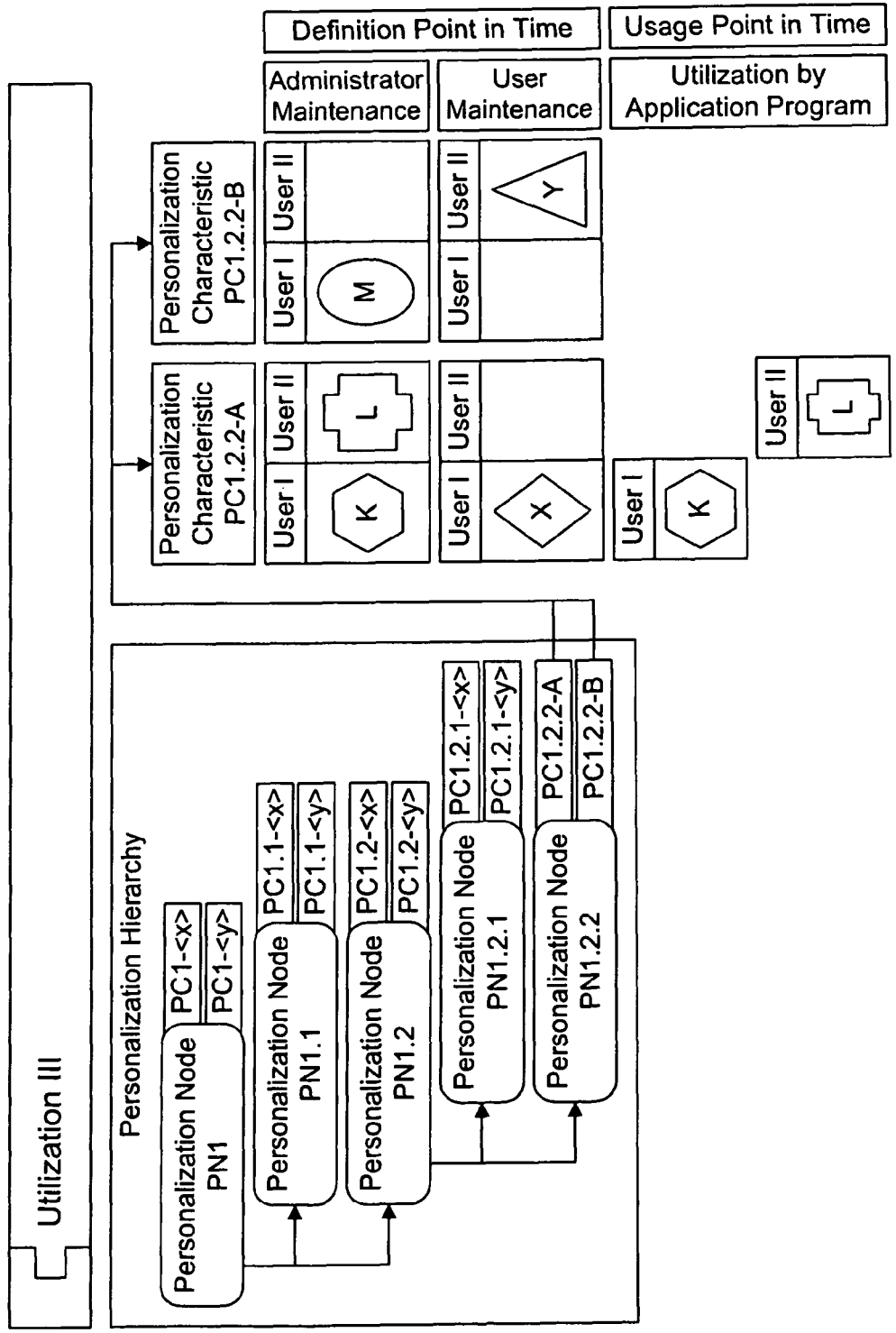
FIG. 11 shows a third example of the utilization of a personalization hierarchy.

FIG. 11 shows a third example of the utilization of a personalization hierarchy. While running, a third software application needs the personalization data for one personalization characteristic, just like in the example shown in FIG. 10. Only the needed personalization data belonging to this particular characteristic are made available to the software application. The personalization data can be entered and stored at an earlier point in time by the administrator exclusively. Overriding of this personalization data by the end-user is not possible.

In the example in FIG. 11, the application program needs the characteristic PC1.2.2-A belonging to personalization node PN1.2.2. The respective characteristic values should exclusively be maintained by the administrator.

Figure 12:
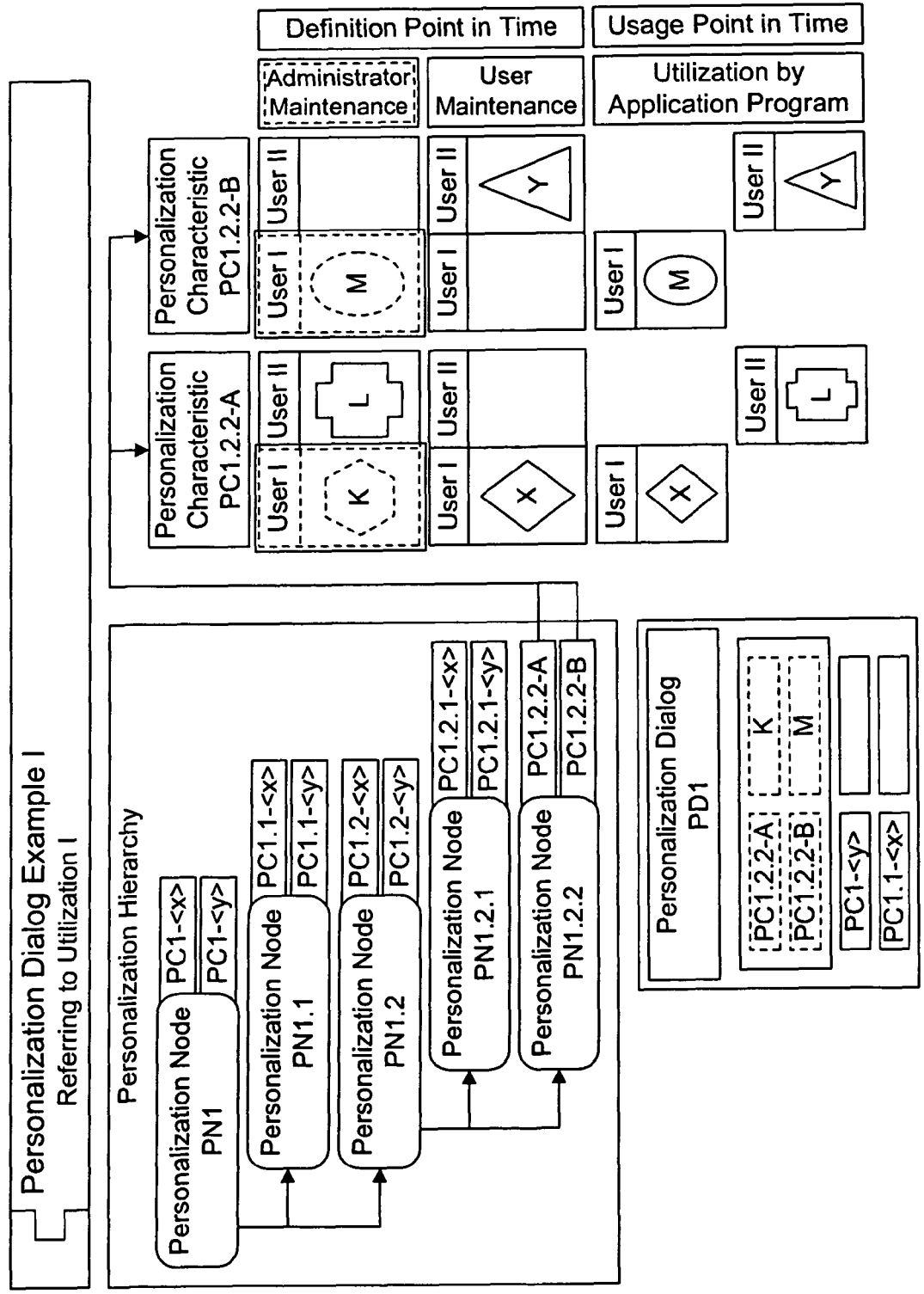
FIG. 12 shows a first example of the utilization of personalization dialogs.

FIG. 12 shows a first example of the utilization of personalization dialogs. For the characteristics of the personalization hierarchy shown in FIG. 9, the personalization data for an end-user are entered and stored by the administrator by means of a personalization dialog.

In the example in FIG. 12, an administrator starts personalization dialog PD1 for user I. The administrator maintains personalization values for the characteristics PC1.2.2-A and PC1.2.2-B.

Figure 13:
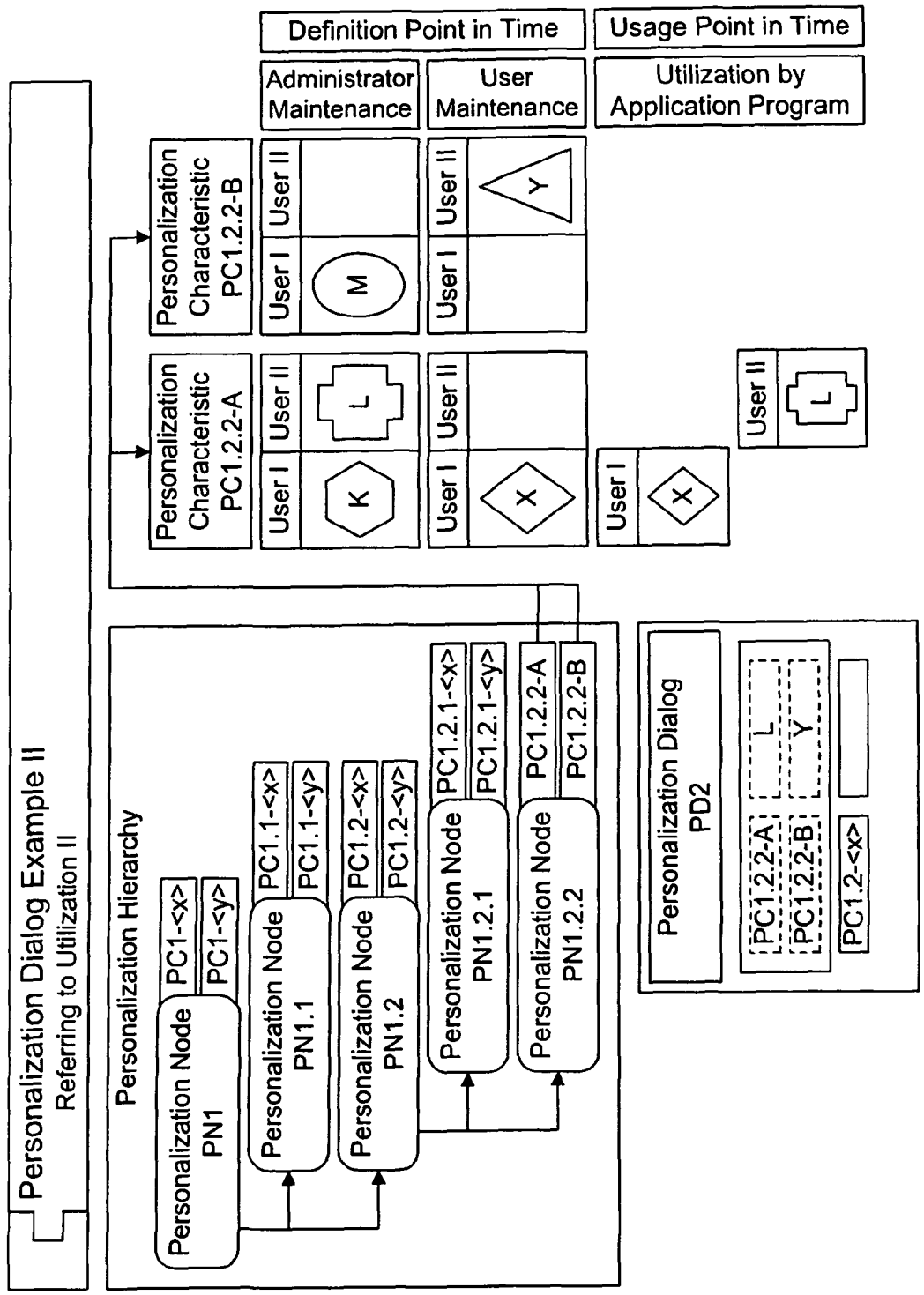
FIG. 13 shows a second example of the utilization of personalization dialogs.

FIG. 13 shows a second example of the utilization of personalization dialogs. For the characteristics of the personalization hierarchy shown in FIG. 10, the personalization data for an end-user are entered and stored by the end-user by means of a second personalization dialog.

In the example in FIG. 13, a user II starts dialog PD2 to personalize the data the user needs. The user maintains the personalization value for the characteristic PC1.2.2-B, but does not change the default value for the characteristic PC1.2.2-A provided by the administrator.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for personalizing software programs in a computer system, comprising:

determining default values for personalization data for a plurality of end-users at start-up of a program in the computer system, the default values being personalized individually with regard to a specific end-user such that the program started-up by the end-user runs in a fashion that is adapted to the individual needs or preferences of the end-user as determined by the personalization data;

providing two levels of personalization, in each of which personalization data for the end-users can be stored, the two levels of personalization including a first, administrative personalization level containing administrative personalization data for the end-user which can be set by a system administrator, but not by the end-user, and a second, individual personalization level containing additional, individual personalization data, which can be set by the end-user, wherein the individual personalization data of the individual personalization level overrides, modifies, or limits the administrative personalization data of the administrative personalization level;

displaying, to the end-user, information related to the personalization data stored in the levels for the end-user, at the start-up of the program, the displayed information corresponding to an input mask used to capture the personalization data;

arranging, in the computer system, a hierarchical personalization data filling system comprising personalization nodes and an ordering node arranged in a tree structure, the personalization nodes being assigned at least one personalization characteristic, wherein the ordering node is used for implementing an ordering function and is not associated with a personalization characteristic, and wherein when the program reads out the personalization data on personalization characteristics of a lower-ranking personalization node, the program is automatically provided also with the personalization data on personalization characteristics of personalization nodes ranking higher in the direct analytical path; and accessing the program remotely by using a different computer system such that the parameterized program is automatically and remotely adapted to the preferences of the end-user based on the personalization data.

2. The method according to claim 1, wherein the computer system comprises a dialog software for the input of personalization data for the end-users by at least one of the end-user and the system administrator, and wherein the dialog software comprises input masks.

3. The method according to claim 2, wherein the dialog software is a browser software for web applications.

4. The method according to claim 1, wherein at least one of the personalization characteristics is assigned to each of the personalization nodes.

5. The method according to claim 1, wherein the method is set in a software application which personalization data is retrieved from.

6. The method according to claim 1, wherein the personalization data is read-out in sequential order.

7. The method according to claim 6, wherein the sequential order is set in the application program.

8. The method according to claim 1, wherein the personalization data comprises default values for certain user profiles.

9. The method according to claim 1, wherein the personalization data can be input by the end-user or the administrator in a personalization dialog.

10. The method according to claim 1, wherein the administrator can set which personalization data can be changed individually by the end-user and which personalization data cannot be changed individually by an end-user.

11. The method according to claim 1, wherein the computer system comprises a tool for automatic determination of administrative personalization data.

12. The method according to claim 11, wherein the automatic determination of personalization data is performed on the level of end-user authorizations.

13. The method according to claim 1, wherein the computer system comprises a tool for automatic determination of individual standard personalization data.

14. The method according to claim 1, wherein a time dependence associated with personalization data is stored along with personalization data.

15. The method according to claim 1, wherein the computer system comprises dynamic calculation of personalization data by means of personalization variables.

16. The method according to claim 1, wherein the corresponding personalization data can be stored only in the form of a single or in multiple flags.

17. The method according to claim 1, wherein the corresponding personalization data is stored in the form of single values, intervals or groups.

18. The method according to claim 17, wherein the personalized intervals or groups are resolved into their single values and stored.

19. The method according to claim 1, wherein the software application being executed reads out the stored personalization data and takes it into account in its processing.

20. The method according to claim 1, wherein the personalization data is stored in a server only, but not in the client, such that it is provided to the end-user regardless of which client he uses for logging into the computer system.

21. A computer program product tangibly embodied in a non-transitory computer-readable storage medium, the storage medium comprising instructions which when executed on a processor, cause the processor to perform a method, the method comprising:
    determining default values for personalization data for a plurality of end-users at start-up of a program in the computer system, the default values being personalized individually with regard to a specific end-user such that the program started-up by the end-user runs in a fashion that is adapted to the individual needs or preferences of the end-user as determined by the personalization data;
    providing two levels of personalization, in each of which personalization data for the end-users can be stored, the two levels of personalization including a first, administrative personalization level containing administrative personalization data for the end-user which can be set by a system administrator, but not by the end-user, and a second, individual personalization level containing additional, individual personalization data, which can be set by the end-user, wherein the individual personalization data of the individual personalization level overrides, modifies, or limits the administrative personalization data of the administrative personalization level;
    displaying, to the end-user, information related to the personalization data stored in the levels for the end-user, at the start-up of the program, the displayed information corresponding to an input mask used to capture the personalization data;
    arranging, in the computer system, a hierarchical personalization data filling system comprising personalization nodes and an ordering node arranged in a tree structure, the personalization nodes being assigned at least one personalization characteristic, wherein the ordering node is used for implementing an ordering function and is not associated with a personalization characteristic, and wherein when the program reads out the personalization data on personalization characteristics of a lower-ranking personalization node, the program is automatically provided also with the personalization data on personalization characteristics of personalization nodes ranking higher in the direct analytical path; and
    accessing the program remotely by using a different computer system such that the parameterized program is automatically and remotely adapted to the preferences of the end-user based on the personalization data.

22. A non-transitory computer-readable storage medium containing instructions, which when executed on a processor, cause the processor to perform a method for personalizing software programs in a computer system, the method comprising:
    determining default values for personalization data for a plurality of end-users at start-up of a program in the computer system, the default values being personalized individually with regard to a specific end-user such that the program started-up by the end-user runs in a fashion that is adapted to the individual needs or preferences of the end-user as determined by the personalization data;
    providing two levels of personalization, in each of which personalization data for the end-users can be stored, the two levels of personalization including a first, administrative personalization level containing administrative personalization data for the end-user which can be set by a system administrator, but not by the end-user, and a second, individual personalization level containing additional, individual personalization data, which can be set by the end-user, wherein the individual personalization data of the individual personalization level overrides, modifies, or limits the administrative personalization data of the administrative personalization level;
    displaying, to the end-user, information related to the personalization data stored in the levels for the end-user, at the start-up of the program, the displayed information corresponding to an input mask used to capture the personalization data;
    arranging, in the computer system, a hierarchical personalization data filling system comprising personalization nodes and an ordering node arranged in a tree structure, the personalization nodes being assigned at least one personalization characteristic, wherein the ordering node is used for implementing an ordering function and is not associated with a personalization characteristic, and wherein when the program reads out the personalization data on personalization characteristics of a lower-ranking personalization node, the program is automatically provided also with the personalization data on personalization characteristics of personalization nodes ranking higher in the direct analytical path; and
    accessing the program remotely by using a different computer system such that the parameterized program is automatically and remotely adapted to the preferences of the end-user based on the personalization data.

23. A method for personalizing software programs in a computer system, comprising:
    determining default values for personalization data for a plurality of end-users at start-up of a program in the computer system, the default values being personalized individually with regard to a specific end-user such that the program started-up by the end-user runs in a fashion that is adapted to the individual needs or preferences of the end-user as determined by the personalization data;

providing two levels of personalization, in each of which personalization data for the end-users can be stored, the two levels of personalization including a first, administrative personalization level containing administrative personalization data for the end-user which can be set by a system administrator, but not by the end-user, and a second, individual personalization level containing additional, individual personalization data, which can be set by the end-user, wherein the individual personalization data of the individual personalization level overrides, modifies, or limits the administrative personalization data of the administrative personalization level;

displaying, to the end-user, information related to the personalization data stored in the levels for the end-user, at the start-up of the program, the displayed information corresponding to an input mask used to capture the personalization data;

arranging, in the computer system, a hierarchical personalization data filling system comprising personalization nodes and an ordering node arranged in a tree structure, the personalization nodes being assigned at least one personalization characteristic, wherein the ordering node is used for implementing an ordering function and is not associated with a personalization characteristic;

reading out, using the program, the personalization data on personalization characteristics of a lower-ranking personalization node, the program being automatically provided with the personalization data on personalization characteristics of personalization nodes ranking higher in the direct analytical path of the lower-ranking personalization node;

accessing, using the program, at least one personalization node, assigned to at least one personalization characteristic corresponding to the specific end-user, on a hierarchy level of the tree structure, the program being provided with a complete context, the complete context comprising the personalization data of the at least one personalization node and the personalization data of personalization nodes ranked higher than the hierarchy level, the personalization data of the complete context including the administrative personalization data stored in the administrative personalization level and the individual personalization data stored in the individual personalization level, wherein based on the hierarchy level of the personalization characteristic corresponding to the specific end-user, the individual personalization data and the administrative personalization data of the complete context is available for accessing at the at least one personalization node; and accessing the program remotely by using a different computer system such that the parameterized program is automatically and remotely adapted to the preferences of the end-user based on the personalization data.

\* \* \* \* \*